US012624896B2

(12) United States Patent
Dappen et al.

(10) Patent No.: US 12,624,896 B2
(45) Date of Patent: May 12, 2026

(54) DEVICE FOR INDUCTION HEATING OF AT LEAST ONE WORKPIECE AND METHOD FOR INDUCTION HEATING OF AT LEAST ONE WORKPIECE

(71) Applicant: SMS Elotherm GmbH, Remscheid (DE)

(72) Inventors: Stefan Dappen, Cologne (DE); Thomas Daube, Duisburg (DE); Markus Langejürgen, Wipperfürth (DE); Frank Maschler, Duisburg (DE); Christian Vogt, Wuppertal (DE)

(73) Assignee: SMS Elotherm GmbH, Remscheid (DE)

( * ) Notice: Subject to any disclaimer, the term of this patent is extended or adjusted under 35 U.S.C. 154(b) by 0 days.

(21) Appl. No.: 18/860,136

(22) PCT Filed: Apr. 24, 2023

(86) PCT No.: PCT/EP2023/060577

§ 371 (c)(1),
(2) Date: Oct. 25, 2024

(87) PCT Pub. No.: WO2023/208805

PCT Pub. Date: Nov. 2, 2023

(65) Prior Publication Data

US 2025/0257945 A1 Aug. 14, 2025

(30) Foreign Application Priority Data

Apr. 29, 2022 (EP) .................................... 22170873

(51) Int. Cl.

| | |
|---|---|
| ***F27B 9/04*** | (2006.01) |
| ***F27B 9/06*** | (2006.01) |
| ***F27B 9/28*** | (2006.01) |
| ***F27B 9/30*** | (2006.01) |
| ***F27B 9/34*** | (2006.01) |
| ***F27D 1/00*** | (2006.01) |
| ***F27D 19/00*** | (2006.01) |
| ***F27D 21/00*** | (2006.01) |

(52) U.S. Cl.

CPC .............. *F27B 9/047* (2013.01); *F27B 9/067* (2013.01); *F27B 9/28* (2013.01); *F27B 9/3005* (2013.01);

(Continued)

(58) Field of Classification Search

CPC ..... F27D 2021/0007; F27D 2019/0068; F27D 21/00; F27D 1/0009; F27B 9/34;

(Continued)

(56) References Cited

U.S. PATENT DOCUMENTS 4,620,309 A * 10/1986 Schultz .................... H05B 3/66 373/128

5,544,195 A * 8/1996 Hardt .................. B23K 28/003 373/79

(Continued)

FOREIGN PATENT DOCUMENTS

CN 102090157 A 6/2011
CN 103069243 A 4/2013

(Continued)

*Primary Examiner* — Jimmy Chou

(74) *Attorney, Agent, or Firm* — The Webb Law Frim

(57) ABSTRACT

The invention relates to a device for inductively heating at least one workpiece, in particular a substantially strip-shaped workpiece, including at least one furnace housing; at least one inductor arrangement arranged within the furnace housing, the inductor arrangement being arranged at least partially in an inductor region of the furnace housing; at least one heating region for receiving process gas. The heating region being arranged within the furnace housing; and separating material for separating, in particular for thermally separating, the inductor region and the heating region. Furthermore, the invention relates to a method for inductively heating at least one workpiece.

7 Claims, 1 Drawing Sheet

(52) U.S. Cl.
CPC .............. *F27B 9/34* (2013.01); *F27D 1/0009* (2013.01); *F27D 19/00* (2013.01); *F27D 21/00* (2013.01); *F27D 2019/0068* (2013.01); *F27D 2021/0007* (2013.01)

(58) Field of Classification Search
CPC .......... F27B 9/3005; F27B 9/28; F27B 9/067; F27B 9/047
USPC .......................................................... 373/140
See application file for complete search history.

(56) References Cited

U.S. PATENT DOCUMENTS

| | | | | | |
|---|---|---|---|---|---|
| 5,768,799 | A * | 6/1998 | Delaunay | B05D 3/0281 34/247 |
| 6,375,893 | B1 * | 4/2002 | Raschke | B01D 3/10 373/141 |
| 9,400,136 | B2 * | 7/2016 | Lovens | F27B 9/36 |
| 2007/0181567 | A1 | 8/2007 | Lovens | |
| 2009/0057301 | A1 | 3/2009 | Lovens | |
| 2011/0292962 | A1 * | 12/2011 | Lovens | F27B 9/36 373/142 |

FOREIGN PATENT DOCUMENTS

| | | | | |
|---|---|---|---|---|
| EP | 1900255 | B1 | 12/2008 | |
| EP | 2577201 | B1 | 6/2016 | |
| FR | 744222 | A1 * | 11/1996 | B05D 3/0281 |
| JP | 2005221132 | A | 8/2005 | |
| WO | 2006136701 | A1 | 12/2006 | |
| WO | 2006136702 | A1 | 12/2006 | |
| WO | WO-2011149919 | A2 * | 12/2011 | C21D 9/60 |

* cited by examiner

DEVICE FOR INDUCTION HEATING OF AT LEAST ONE WORKPIECE AND METHOD FOR INDUCTION HEATING OF AT LEAST ONE WORKPIECE

CROSS-REFERENCE TO RELATED APPLICATIONS

This application is the United States national phase of International Application No. PCT/EP2023/060577 filed Apr. 24, 2023, and claims priority to European Patent Application No. 22170873.8 filed Apr. 29, 2022, the disclosures of which are hereby incorporated by reference in their entireties.

BACKGROUND OF THE INVENTION

Field of the Invention

The invention relates to a device for induction heating of at least one workpiece, in particular an essentially strip-shaped workpiece, comprising: at least one furnace housing; at least one inductor arrangement arranged within the furnace housing, the inductor arrangement being arranged at least partially in an inductor region of the furnace housing; at least one heating region for receiving process gas, the heating region being arranged within the furnace housing; and separating material for separating, in particular for thermal separation, the inductor region and the heating region. The invention also relates to a method for induction heating of at least one workpiece, in particular by means of an aforementioned device.

Devices for induction heating are known from the prior art and can, for example, be referred to as continuous tunnel furnaces or electro-induction tunnel furnaces. Such devices can be used to inductively heat a workpiece. Induction heating processes are usually referred to as processes in which the surface of a material to be heated, in particular a steel material, is heated by means of an electromagnetic field induced in the workpiece.

In such a process, the furnace tunnel can be filled with a process gas which should not escape from the furnace tunnel into an atmosphere surrounding the furnace tunnel. This is because if the process gas escapes from the furnace tunnel, not only can the air surrounding the continuous tunnel furnace be contaminated, but an explosive reaction of the process gas can also occur.

Accordingly, conventional continuous tunnel furnaces usually have an essentially gas-tight furnace tunnel, which is connected to a gas-tight connection duct upstream and downstream of a heating section. An inductor arrangement can either enclose the workpiece or be arranged above and/or below the at least one workpiece.

The problem with such an arrangement, however, is that the material usually used for gas-tight separation is at least partly made of metal, which would also heat up unacceptably when an inductor arrangement is used in the same way as the at least one workpiece.

Description of Related Art

EP 2 577 201 B1 discloses an electro-induction tunnel furnace having a gas-tight barrier chamber surrounding a gas-tight tunnel region, with a gas-tight separating plane or a gas-tight separating material being arranged between the tunnel region and the barrier chamber. In order to avoid an exchange of a barrier gas arranged in the barrier chamber and a process gas arranged in the tunnel region, the electro-induction tunnel furnace also has a barrier gas regulator.

However, when providing such a gas-tight separating plane, the problem arises in practice that gas-tight materials are either metallic, i.e. problematic for the penetration of the magnetic field or such a penetration can only be realized with high energy losses, or can only be realized with a temperature-critical polymer material. Another disadvantage is that in the event of a high pressure difference between the barrier chamber and the tunnel region, large forces can act on the separating plane, whereby the forces can jeopardize the integrity of the separating plane. In addition, the gas-tight connection to a connecting duct can only be achieved with a high level of design effort.

SUMMARY OF THE INVENTION

Based on the aforementioned prior art, the present invention is thus based on the technical problem of providing a device and a method for induction heating of at least one workpiece, which enable reliable and safe operation of the device or reliable and safe operation of the method in a structurally simple manner.

According to a first aspect of the present invention, the aforementioned technical problem is solved in an aforementioned device in that the separating material is designed in such a way that there is a fluidic connection between the inductor region and the heating region.

By providing a fluidic connection between the inductor region and the heating region, a fluidic exchange of a medium arranged in the inductor region and a medium arranged in the heating region can be provided. In particular, the respective media are gases or gas mixtures that are located inside the furnace housing.

For example, it has proven to be advantageous to flush the entire furnace housing with an inert housing gas, for example nitrogen or a nitrogen mixture, before starting operation of the device for induction heating of the at least one workpiece and then to fill it with the process gas used during operation of the aforementioned device, for example with hydrogen or a hydrogen mixture. In this way, residual air concentrations or residual oxygen concentrations in the inductor region can be reliably avoided during operation of the device for induction heating of the at least one workpiece, thus ensuring reliable operation of the at least one inductor arrangement.

A fluidic connection between the inductor region and the heating region means in particular that gaseous media can flow along a pressure gradient from the inductor region in the direction of the heating region or from the heating region in the direction of the inductor region. Preferably, the separating material is essentially thermally stable, so that the properties of the separating material essentially do not change even at high temperatures. Furthermore, it is preferred that the heating region is essentially in the form of a tunnel-shaped furnace channel.

In a preferred embodiment of the present invention, the separating material has at least one through-opening for fluidic connection of the inductor region and the heating region. By providing a through-opening in the separating material, a fluidic connection between the inductor region and the heating region can be provided in a structurally favorable manner.

Preferably, the at least one through-opening has a diameter of at least 1 mm and/or a cross-sectional region of at least 1 $mm^2$. Furthermore, it is preferred that the at least one through opening is essentially circular.

According to a preferred embodiment of the invention, the at least one through-opening can be at least partially closed by at least one flap, so that the exchange of gases or gas mixtures between the inductor region and the heating region can be regulated.

A preferred embodiment of the invention is characterized in that the separating material is designed as an at least partially permeable material for fluidically connecting the inductor region and the heating region. By means of the design of the separating material as an at least partially permeable material, an advantageous, essentially uniform fluidic connection can be provided over essentially the entire extent of the separating material. It is preferable that the permeable material is in particular gas-permeable, so that the process gas and/or the housing gas can flow along a pressure gradient from the inductor region into the heating region or vice versa.

In a further preferred embodiment of the invention, the separating material comprises a fabric, in particular a fabric made of high-temperature fibers. By providing a fabric, it is preferably possible to provide a permeable material for the fluidic connection of the inductor region and the heating region. The fabric is advantageously a fabric made of high-temperature fibers, as these are suitable for the temperatures occurring in the interior of the furnace housing, in particular in the interior of the heating region. The high-temperature fibers are, for example, silicate glass fibers.

A further preferred embodiment of the present invention is characterized in that the inductor region has at least one inlet for feeding housing gas, and in that a control means regulates the feeding of housing gas into the inductor region such that there is a pressure gradient from the housing gas arranged in the inductor region in the direction of process gas arranged in the heating region. As the housing gas arranged in the inductor region has a higher pressure than the process gas arranged in the heating region, it can be reliably prevented that process gas from the heating region can penetrate into the inductor region. This can prevent hot process gas from entering the inductor region. The inlet can also be used to fill the process gas into the heating region. For example, the process gas and the housing gas can also be essentially identical gases and/or gas mixtures. For example, the housing gas and the process gas may differ in their respective temperatures, with the temperature of the housing gas preferably being lower than the temperature of the process gas.

In particular, the process gas is a highly flammable gas, especially a highly flammable gas mixture, especially if it is mixed with oxygen. For example, the process gas may be a hydrogen and/or nitrogen mixture or pure hydrogen. Accordingly, the provision of a pressure gradient can prevent the process gas from flowing from the heating region into the inductor region or into the furnace environment and mixing with oxygen, which could result in a highly flammable gas mixture. The housing gas is preferably an inert gas, such as nitrogen or a nitrogen mixture.

The aforementioned pressure gradient also enables an essentially constant flow of the housing gas in the direction of the heating region, which means that the inductor region can be continuously purged. Preferably, the temperature of the process gas is greater than the temperature of the housing gas. For example, the process gas has the same composition as the housing gas. Alternatively, the process gas has a different composition than the housing gas. In particular, the process gas is a hydrogen and/or nitrogen mixture or pure hydrogen, whereby the housing gas is an inert gas, preferably nitrogen or a nitrogen mixture.

In a further preferred embodiment of the invention, the inductor region has at least one outlet. By providing an outlet, the furnace housing comprising the inductor region and the heating region can first be purged by means of a substantially inert gas, for example by means of the housing gas, when the device for induction heating of the at least one workpiece is started, the gas being introduced through the at least one inlet and discharged through the at least one outlet. This enables the interior of the oven to be reliably purged of ambient air. Preferably, the at least one outlet is closed during operation of the device for induction heating of at least one workpiece.

A further preferred embodiment of the invention is characterized in that the device further comprises at least one measuring means for measuring a pressure within the inductor region and/or within the heating region and/or the differential pressure between the inductor region and the heating region. The provision of at least one measuring means can enable improved regulation of the control means for feeding housing gas into the inductor region. In particular, the heating region comprising process gas can also be purged by means of the housing gas, so that reduced temperatures are also present within the heating region and the overall probability of ignition can be reduced.

Furthermore, a further embodiment of the invention is characterized in that the device comprises at least one flow measuring means for measuring a flow rate of the housing gas fed in, and/or in that the device further comprises at least one dew point measuring means for measuring the dew point of the gas mixture arranged in the inductor region and/or the dew point of the gas mixture arranged in the process region. The provision of at least one of the aforementioned measuring means can enable improved control of the control means for feeding housing gas into the inductor region.

In a further preferred embodiment of the present invention, the control means regulates the feed of housing gas into the inductor region in such a way that there is a pressure gradient from the housing gas arranged in the inductor region towards the ambient air arranged around the furnace housing. This can also prevent hot and possibly highly flammable process gas from passing from the heating region via the inductor region to the furnace environment outside the furnace housing.

A further preferred embodiment of the invention is characterized in that the device further comprises a transport device for substantially longitudinally transporting a workpiece to be induction-heated along the substantially longitudinal extent of the heating region. By providing such a transport device, essentially uniform heating can be provided over the entire length of the workpiece. For example, the speed of the workpiece to be moved can be variably adjusted by means of the transport device, whereby, among other things, the thermal treatment of the workpiece can also be changed.

In another preferred embodiment, thermal insulation is provided between the separating material and the heating region. In addition to the existing separating material, thermal insulation enables further thermal shielding of the inductor region from the heating region. Preferably, the thermal insulation is designed in the same way as the separating material, so that there is still a fluidic connection between the inductor region and the heating region through the separating plane and the thermal insulation. The thermal insulation can also be formed by the separating material alone.

According to a second aspect of the invention, the aforementioned technical problem is solved in a method for inductively heating at least one workpiece, in particular by means of a device as described above, in that the method comprises the following steps:

Guiding a workpiece to be heated along a heating region of a furnace housing filled with a process gas;

Heating the workpiece by means of at least one inductor arrangement arranged in a housing gas-filled inductor region;

Establishing a fluidic connection between the inductor region and the heating region, in particular by means of a separating material arranged between the inductor region and the heating region; and Feeding housing gas into the inductor region in such a way that there is a pressure gradient from the housing gas arranged in the inductor region in the direction of the process gas arranged in the heating region.

The housing gas can be fed into the inductor region temporarily or constantly, for example. In an advantageous manner, the housing gas is fed into the inductor region in such a way that only a gas exchange in the direction of the heating region can take place, so that essentially no process gas can pass from the heating region into the inductor region. Further advantages described in connection with the present method are described with respect to the aforementioned device.

In one embodiment of the present invention, the quantity of housing gas to be fed in is determined as a function of the pressure difference existing between the inductor region and the heating region, and/or the quantity of housing gas to be fed in is determined as a function of the housing gas flow occurring between the inductor region and the heating region, in particular as a function of the volume flow of the housing gas. This enables reliable control of the quantity of gas or gas mixture to be fed in.

In a further embodiment of the aforementioned invention, the housing gas is fed into the inductor region in such a way that the temperature, in particular the average temperature, of the housing gas in the inductor region is lower than the temperature, in particular the average temperature, of the shielding gas in the heating region. This can further reduce the probability of ignition of any gas that may enter the inductor region.

A further preferred embodiment of the present invention is characterized in that, before a workpiece to be heated is guided along the heating region of the furnace housing, the inductor region and the heating region are first purged by means of the housing gas; in that the process gas is then fed into the heating region; and in that further housing gas is preferably subsequently fed into the inductor region. With such a procedure, it can be ensured in particular that no critical residual air concentrations remain in the furnace environment before the device is put into operation. In particular, possible condensate formation, preferably on the inductor arrangement, can also be avoided.

A further advantageous embodiment of the invention is characterized in that the gas mixture fed into the inductor region is such that the dew point of the housing gas arranged in the inductor region is shifted towards lower temperatures compared to the dew point of the process gas arranged in the process region, and/or in that the dew point of the housing gas arranged in the inductor region is monitored essentially constantly and housing gas is fed in as a function of the dew point. In this way, reliable control of the gas mixture fed in can be provided. Preferably, the gas mixture fed into the inductor region has a lower temperature than the process gas.

Further advantageous, exemplary embodiments of aspects of the invention can be found in the following detailed description of some exemplary embodiments of the present invention, in particular in conjunction with the figures. However, the figures accompanying the application are intended only for the purpose of clarification and not for determining the scope of protection of the invention. The accompanying figures are not necessarily to scale and are merely intended to reflect the general concept of the present invention by way of example. In particular, features contained in the figures are in no way to be construed as necessarily forming part of the present invention.

DESCRIPTION OF THE INVENTION

In the following description of the various embodiments according to the invention, components and elements with the same function and the same mode of operation are provided with the same reference signs, even if the components and elements may differ in their dimensions or shape in the various embodiments.

Figure 1:
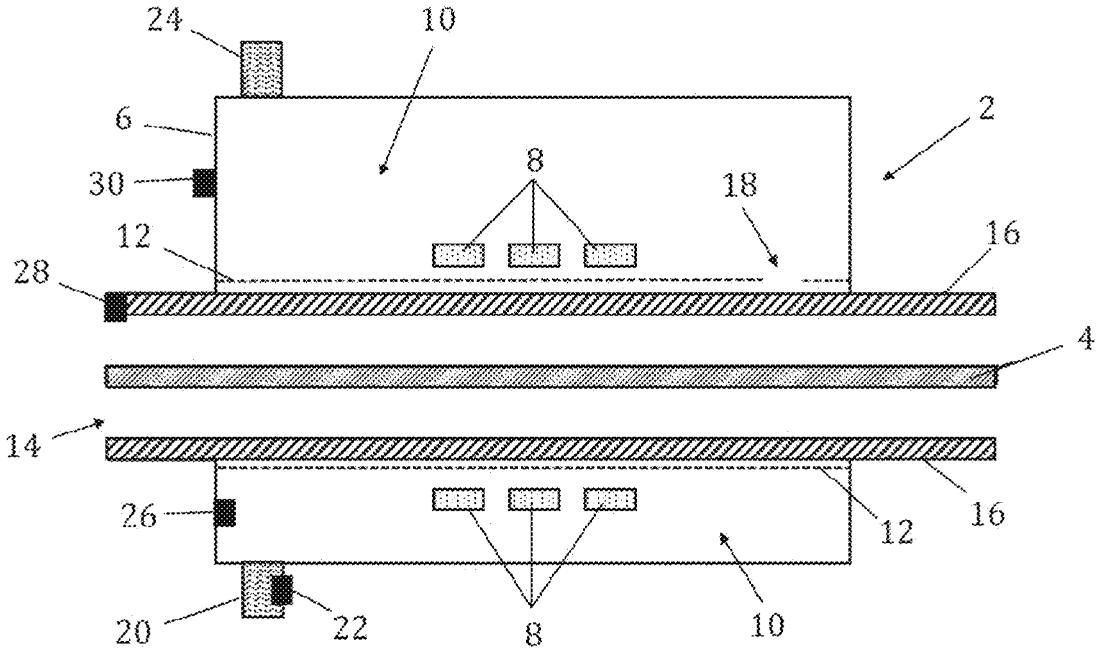
FIG. 1 a schematic representation of a first embodiment of the device according to the invention.

FIG. 1 shows a first embodiment of a device 2 for inductively heating at least one strip-shaped workpiece 4. The device 2 comprises a furnace housing 6 and an inductor arrangement 8 arranged inside the furnace housing 6. The inductor arrangement 8 can completely enclose the strip-shaped workpiece 4.

The inductor arrangement 8 is arranged in an inductor region 10, whereby the inductor region 10 is separated from a heating region 14 by means of separating material 12, in particular thermally. In addition to the separating material 12, thermal insulation 16 is provided between the separating material 12 and the heating region 14, wherein the separating material 12 and the thermal insulation 16 are designed in such a way that there is a fluidic connection between the inductor region 10 and the heating region 14.

For this purpose, the separating material 12 has at least one through-opening 18 for fluidic connection of the inductor region 10 and the heating region 14. In addition, the separating material 12 is designed as an at least partially permeable material, so that a fluidic exchange between the inductor region 10 and the heating region 14 can also take place away from the through opening 18.

The inductor region 10 has an inlet 20 for feeding a gas mixture, in particular housing gas, into the inductor region 10. Furthermore, a control means 22 is provided at the inlet 20, which regulates the feed of housing gas into the inductor region 10 in such a way that there is a pressure gradient from the housing gas arranged in the inductor region 10 towards the process gas arranged in the heating region 14. This makes it possible to avoid a flow of process gas arranged in the heating region 14 in the direction of the inductor region 10 or outside the furnace housing.

The inductor region 10 also has an outlet 24. By providing the outlet 24, the furnace housing 6 can be purged by means of a substantially inert gas, for example by means of the housing gas, when the device 2 is started.

Furthermore, the device has a measuring means 26 in the inductor region 10, a measuring means 28 within the heating region 14 and a further measuring means 30 on the outside of the furnace housing. The measuring means 26, 28 and 30 can, for example, be designed to measure the pressure present in the inductor region 10, in the heating region 14 and/or in the ambient air. The measuring means 26 and 28 can also be designed for measuring the dew point of the gas or gas mixture present in the inductor region 10 and/or in the heating region 14. The control means 22 can also have a measuring means for measuring the flow rate of the housing gas fed in.

Figure 2:
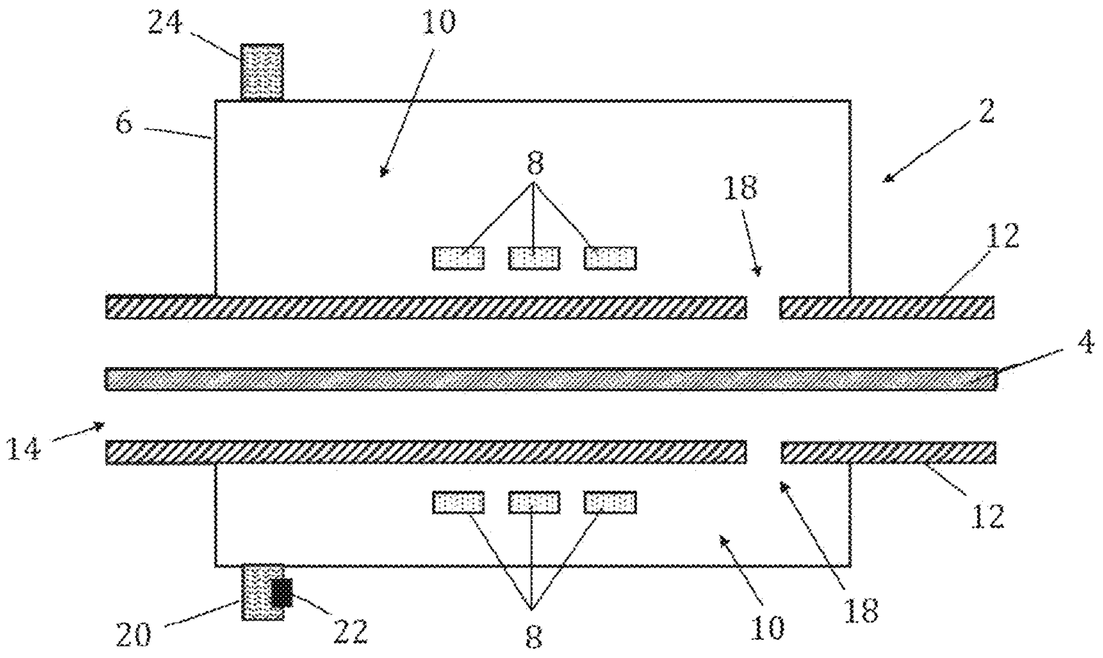
FIG. 2 a schematic representation of a second embodiment of the device according to the invention.

FIG. 2 shows a schematic side view of a second embodiment of the device 2 according to the invention. In contrast to the embodiment of the device 2 shown in FIG. 1, the separating material 12 is designed as thermal insulation, the separating material 12 having through openings 18 for establishing a fluidic connection between the inductor region 10 and the heating region 14. At the start of a heating treatment, the air arranged in the furnace housing 6 can be displaced, for example by inert gas, by means of the inlet 20. The inductor region 10 and the heating region 14 can therefore be purged. This can prevent the process gas subsequently introduced into the inductor region 10 and the heating region 14 from reacting with residual air concentrations within the furnace housing 6.

LIST OF REFERENCES

2 Device
4 Workpiece
6 Furnace housing
8 Inductor arrangement
10 Inductor region
12 Separation material
14 Heating region
16 Thermal insulation
18 Through-opening
20 Inlet
22 Control means
24 Outlet
26 Measuring equipment for the inductor region
28 Measuring equipment for the heating region
30 Measuring equipment for the ambient air

The invention claimed is:

1. A device for inductively heating at least one workpiece, comprising at least one furnace housing;

at least one inductor arrangement arranged within the furnace housing, the inductor arrangement being arranged at least partially in an inductor region of the furnace housing;

at least one heating region for receiving process gas, the heating region being arranged within the furnace housing; and separating material for thermally separating the inductor region and the heating region, wherein a thermal insulation is provided between the separating material and the heating region;

wherein the separating material is designed in such a way that there is a fluidic connection between the inductor region and the heating region, wherein the separating material is designed as an at least partially permeable material for the fluidic connection between the inductor region and the heating region, and the permeable material is designed gas-permeable.

2. The device according to claim 1, wherein the separating material has at least one through-opening for the fluidic connection between the inductor region and the heating region.

3. The device according to claim 1, wherein the separating material comprises a fabric made of high-temperature fibers.

4. A method for inductively heating at least one workpiece by means of a device according to claim 1, comprising the following steps:

guiding a workpiece to be heated along the at least one heating region of the furnace housing filled with process gas;

heating the workpiece with the at least one inductor arrangement arranged in the inductor region;

establishing a fluidic connection between the inductor region and the heating region with the separating material arranged between the inductor region and the heating region; and feeding a housing gas into the inductor region in such a way that there is a pressure gradient from the housing gas arranged in the inductor region towards the process gas arranged in the heating region.

5. The method according to claim 4, wherein before a workpiece to be heated is guided along the heating region of the furnace housing, the inductor region and the heating region are first purged by the housing gas;

the process gas is then fed into the heating region; and additional housing gas is subsequently fed into the inductor region.

6. The method according to claim 4, wherein the housing gas fed into the inductor region has a dew point lower than a dew point of the process gas arranged in the process region, and/or the dew point of the housing gas arranged in the inductor region is monitored constantly and housing gas is fed as a function of the dew point.

7. A method according to claim 4, wherein the quantity of the housing gas to be fed in is determined as a function of the pressure difference existing between the inductor region and the heating region, and/or the quantity of the housing gas to be fed in is determined as a function of the housing gas volume flow occurring between the inductor region and the heating region, and/or the housing gas is fed into the inductor region in such a way that the temperature of the housing gas in the inductor region is lower than the temperature of the process gas in the heating region.

* * * * *